United States Patent [19]

Maebayashi

[11] Patent Number: 4,491,341
[45] Date of Patent: Jan. 1, 1985

[54] AUTOMOBILE REAR WHEEL SUSPENSION MECHANISM

[75] Inventor: Jiro Maebayashi, Hiroshima, Japan

[73] Assignee: Mazda Motor Corporation, Hiroshima, Japan

[21] Appl. No.: 436,695

[22] Filed: Oct. 26, 1982

[30] Foreign Application Priority Data

Oct. 27, 1981 [JP] Japan .................... 56-172586
Oct. 29, 1981 [JP] Japan .................... 56-173290
Oct. 29, 1981 [JP] Japan .................... 56-173291

[51] Int. Cl.$^3$ .............................................. B06G 1/00
[52] U.S. Cl. .................................................. 280/688
[58] Field of Search ............... 280/688, 715, 724, 725, 280/726, 690, 697

[56] References Cited

U.S. PATENT DOCUMENTS 3,246,717  4/1966  Dreisziger ............................ 180/73
3,292,945 12/1966  Dangauthier ......................... 280/688
4,341,397  7/1982  Morimura et al. .................... 280/688

Primary Examiner—Richard A. Bertsch
Attorney, Agent, or Firm—Fleit, Jacobson, Cohn & Price

[57] ABSTRACT

An automobile rear wheel suspension mechanism including a carrier for carrying a rear wheel for rotation about an axis of rotation which passes through a center of the rear wheel, a swingable arm having a rear end portion pivotably connected through a substantially vertical pin with the carrier at a portion forwardly of the axis of rotation, the arm having a forward end portion connected with an automobile body for vertical swinging movement about a swing axis inclined transversely inwardly and rearwardly with respect to a transverse line, a substantially transversely extending control rod being provided and having one end connected with the automobile body pivotably about a substantially longitudinally extending first axis and the other end connected, at a portion rearwardly of the portion where the arm is connected to the carrier, with the carrier for pivotable movement about a substantially longitudinally extending second axis.

11 Claims, 5 Drawing Figures

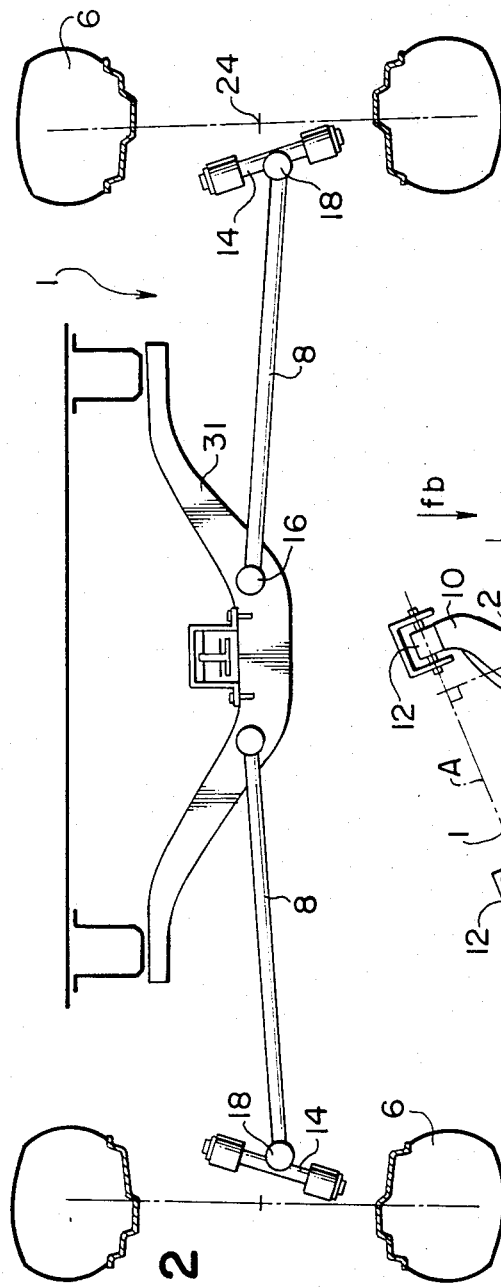
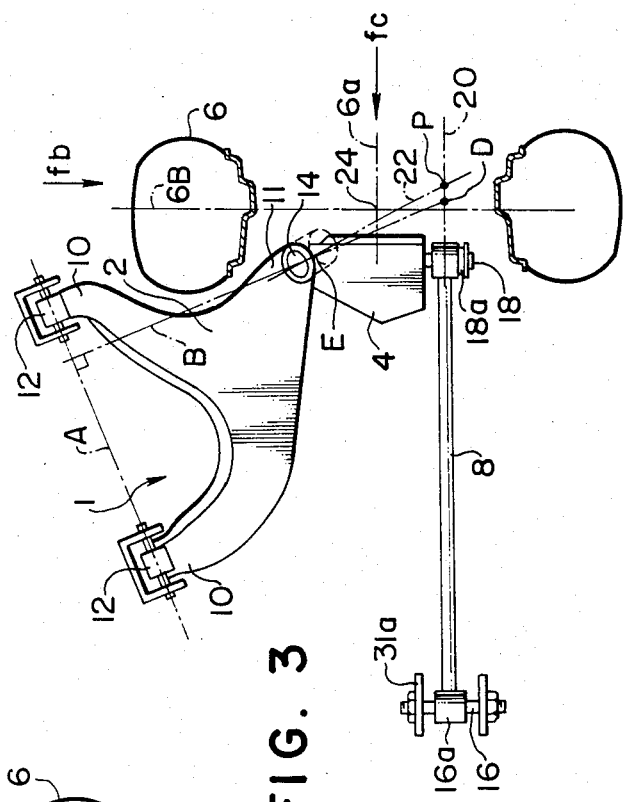
FIG. 2
FIG. 3

AUTOMOBILE REAR WHEEL SUSPENSION MECHANISM

The present invention relates to an automobile rear wheel suspension mechanism, and more particularly to a semi-trailing arm type rear wheel suspension mechanism.

Known types of automobile rear wheel suspension mechanisms include a semi-trailing arm type which comprises a swingable trailing arm having a forward end connected with an automobile body for vertical swinging movement about an axis which is inclined transversely inwardly and rearwardly with respect to a transverse horizontal line, the rear end of the trailing arm supporting a rear wheel for rotation about the axis of the wheel. A suspension strut assembly may be provided between the trailing arm and the automobile body. This type of suspension mechanism is considered as being advantageous in that a desired wheel camber changer can be obtained by suitably determining the inclination of the axis of pivotable movement of the arm. Further advantages of this type of suspension mechanism are that it has a smaller unsprung weight so that it can provide a greater anti-dive effect whereby a greater design versatility can be obtained in respect of controllability and stability, and that the floor height can be decreased since swinging movements of the differential gear unit and the propeller shaft can be suppressed. For these reasons, the semi-trailing arm type suspension mechanism has widely been adopted in sporty type motor cars.

It should however be noted that this type of suspension mechanism has an inherent tendency of producing a toe out change in the rear wheel when a side force is applied thereto during a turning movement or when a longitudinal force is applied thereto during deceleration. In order to provide a satisfactory maneuverability and stability, it is required to produce a desirably controlled toe change as well as a desirable change in the wheel camber angle under the side and/or longitudinal forces applied to the rear wheel, however, the known structure of the semi-trailing arm type suspension mechanism has not been satisfactory to meet such requirements.

In the United States Pat. No. 3,246,717 issued to J. L. Dreisziger on Apr. 19, 1966, there is proposed to connect the rear end portion of the swingable arm through a substantially vertical pivot bolt or king pin to a forward end portion of a wheel bearing housing which rotatably carries the rear wheel. The rear wheel is then connected with the output shaft of the differential gear unit through a transversely extending axle of a fixed length to thereby transmit a driving torque to the rear wheel and at the same time to determine the position of the rear wheel. The proposed arrangement is considered as being able to provide an increased versatility in controlling the position of the rear wheel. It should however be noted that this type of suspension mechanism has inconveniencies in that it cannot use uniform-speed universal joint and that it cannot be applied to a rear suspension of front wheel drive type motor cars. Further, the proposed mechanism cannot produce a desirable toe-in change in the rear wheel under a turning movement or deceleration of the vehicle.

It is therefore an object of the present invention to provide a semi-trailing arm type rear wheel suspension mechanism which has an increased versatility of determining the position of the real wheel.

Another object of the present invention is to provide a semi-trailing arm type rear wheel suspension mechanism which allows to use uniform-speed universal joints in a driving axle.

A further object of the present invention is to provide a semi-trailing arm type rear wheel suspension mechanism which can be used even in front wheel drive type automobiles.

Still further and more specific object of the present invention is to provide a rear wheel suspension mechanism which can produce a toe-in change of the rear wheel under a turing movement and deceleration of vehicle.

According to the present invention, the above and other objects can be accomplished by an automobile rear wheel suspension mechanism including carrier means for carrying a rear wheel for rotation about an axis of rotation which passes through a center of the rear wheel, arm means having a rear end portion pivotably connected through substantially vertical pin means with said carrier means at a portion forwardly of said axis of rotation, said arm means having a forward end portion connected with an automobile body for vertical swinging movement about a swing axis inclined transversely inwardly and rearwardly with respect to a transverse line, substantially transversely extending control rod means having one end connected with the automobile body pivotably about a substantially longitudinally extending first axis and the other end connected, at a portion rearwardly of said portions where said arm means is connected to the carrier means, with said carrier means for pivotable movement about a substantially longitudinally extending second axis. According to the features of the present invention, the rear end of the arm means is pivotably connected with the wheel supporting carrier means so that it is possible to lay out the rear wheel in a versatile manner. Further, since the control rod means is provided as described above, the position of the rear wheel can be determined without relying on the fixed length drive axle. Therefore, the mechanism can be applied even to a front wheel drive type automobile. Further, uniform-speed universal joints can be used in the drive axles. It is preferable that the other end of the control rod means is connected with the carrier means at a portion rearwardly of the axis of rotation of the rear wheel. The term "automobile body" is intended to broadly include any member or part which is secured to the body itself.

According to a preferable aspect of the present invention, said one end of the control rod means which is connected to the body is located transversely inwardly with respect to the other end and the substantially longitudinally extending first axis at which said one end of the control rod means is pivotably connected with the body is at a higher level than the second axis at which said other end of the control rod means is pivotably connected with the carrier means. With this arrangement, it is possible to produce a toe-in movement in the rear wheel when the arm means is upwardly swung.

A similar toe-in movement of the rear wheel can be obtained by an arrangement in which said pin means has a longitudinal axis which is inclined forwardly and inwardly so that a downward extension of longitudinal axis of the pin means intersects a vertical plane passing through a longitudinal axis of the control rod means transversely outwardly and rearwardly of the center of the rear wheel. Alternatively, the arrangement may be such that a line which is perpendicular to said swing axis and passing through axis of the pin means intersects a vertical plane passing through longitudinal axis of the control rod means rearwardly and transversely outwardly of the center of the rear wheel.

The above and other objects and features of the present invention will become apparent from the following descriptions of preferred embodiments taking reference to the accompanying drawings, in which:

FIG. 2 is a diagrammatical rear end view of the suspension mechanism shown in FIG. 1;

FIG. 3 is a plan view of the suspension mechanism shown in FIGS. 1 and 2;

Figure 1:
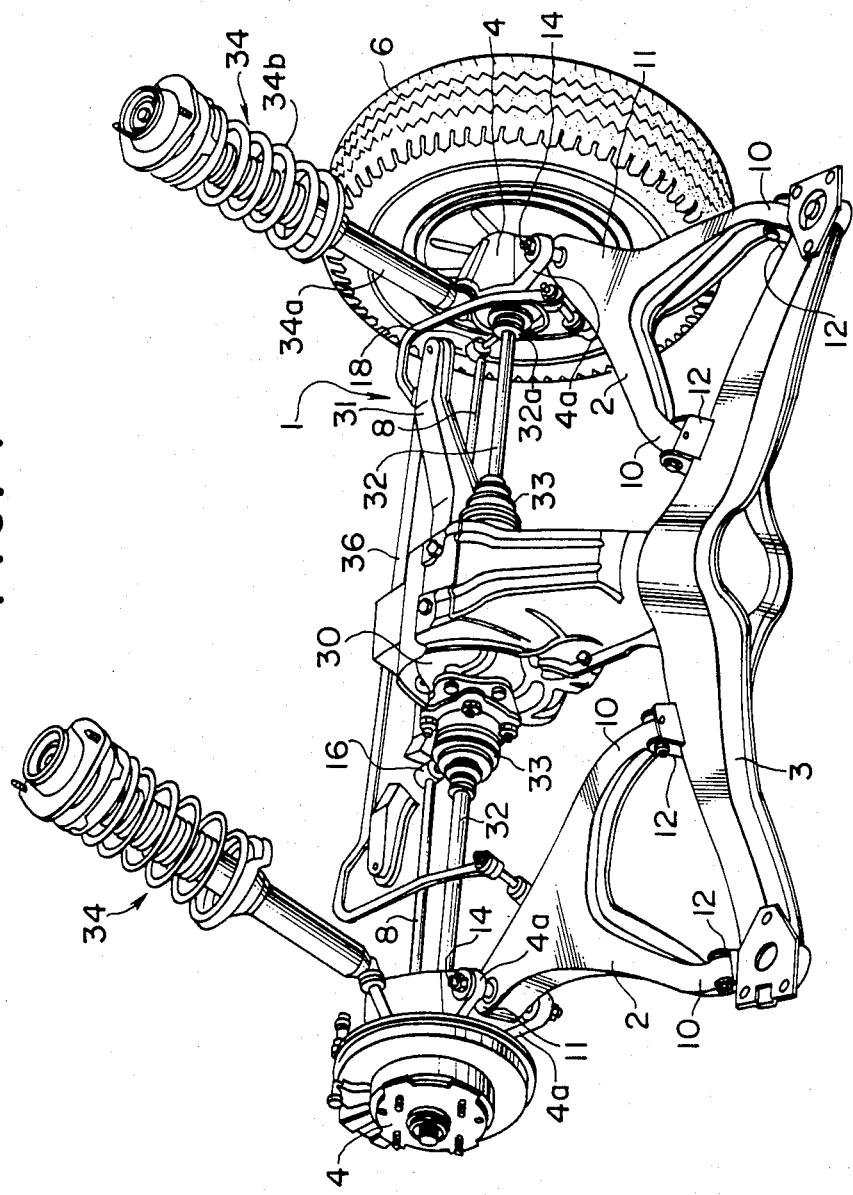
FIG. 1 is a perspective view of a rear wheel suspension mechanism in accordance with one embodiment of the present invention.

Referring now to the drawings, particularly to FIG. 1, there is shown a rear wheel suspension mechanism 1 which is provided at each side of the automobile body and includes a swingable arm 2. The swingable arm 2 has a bifurcated forward end portion including branch arms 10 which are connected through pivotable mounting members 12 of conventional mounting rubber bush type with a front sub-frame member 3 which is attached to the automobile body through rubber mounts (not shown) to constitute a part of the automobile body. A rear wheel 6 is rotatably mounted on a carrier 4 which has a pair of vertically spaced forward extensions 4a. The swingable arm 2 further has a rear end portion 11 which is inserted between the forward extensions 4a of the carrier 4 and pivotably connected thereto by a substantially vertical pivot pin 14.

At each side, there is provided a transversely extending control rod 8 which is as shown in FIGS. 2 and 3 pivotably connected at a transversely outward end with a rear end portion of the carrier 4 by a longitudinally extending shaft 18 through a suitable rubber bush 18a and at a transversely inward end with a mounting bracket 31a which is secured to a rear sub-frame member 31, by a longitudinally extending shaft 16 through a suitable rubber bush 16a. At differential gear case 30 is secured at the front end portion to the front sub-frame member 3 and attached at the rear end portion to the rear sub-frame member 31 through suitable mounting rubbers (not shown). The rear wheel 6 is connected to one end of a transversely extending drive axle 32 through a conventional universal joint 32a and the other end of the axle 32 is connected through a known type of uniform-speed universal joint 33 with an output shaft of a differential gear unit which is provided in the differential gear case 30. As well known in the art, a strut assembly 34 comprised of an oleo strut 34a and a coil spring 34b is provided between the carrier 4 and the automobile body. The swingable arms 2 at the opposite sides of the body are connected together by a stabilizer 36 in a known manner.

As shown in FIG. 3, the pivotable mounting members 12 connect the branch arms 10 of the swingable arm 2 so that the arm 2 is vertically swingable about a swing axis A which is inclined transversely inwardly and rearwardly. It should be noted that in this arrangement the rear portion of the carrier 4 is transversely supported by the control rod 8 so that the driving axle may not be of a fixed length and a uniform speed universal joint may be used in the driving axle. Further, the arrangement can be used even in a front wheel drive type automobile which does not have a rear drive axle. It should further be noted that in the illustrated embodiment, the pivot pin 14 for connecting the rear end portion 11 of the swingable arm 2 with the carrier 4 is inclined forwardly and inwardly so that a downward extension of the longitudinal axis 22 intersect a vertical plane 20 passing through the longitudinal axis of the control rod 8 at a point P transversely outwardly and rearwardly of the center 24 of the rear wheel 6 which is defined as an intersection of a rotating axis 6a and a center plane 6b of the rear wheel 6.

In the arrangement described above, when a transversely inwardly directed side force $f_c$ is applied to the rear wheel 6, deformations are produced in the rubber bushes of the pivotable mounting members 12 to allow the branched arms 10 of the swingable arm 2 to move inwardly substantially along the swing axis A whereas the rear end portion of the carrier 4 is supported against transverse displacement by means of the control rod 8. Therefore, a toe-in movement is produced in the rear wheel 6. When a rearwardly directed longitudinal force $f_b$ is applied to the rear wheel 6, the rear wheel 6 tends to turn inwardly about the point P producing similar deformations in the rubber bushes of the pivotable mounting members 12. Thus, a similar toe-in movement can be produced in the rear wheel 6.

In this embodiment, as shown in FIG. 3, a line B which is perpendicular to the swing axis A and passing through the axis 22 at the longitudinal center E of the pivot pin 14 intersects the vertical plane 20 at a point D outwardly from the center 24 of the rear wheel 6. This arrangement further facilitates the tendency of producing a toe-in movement under the rearwardly directed longitudinal force or the inwardly directed side force.

Figure 4:
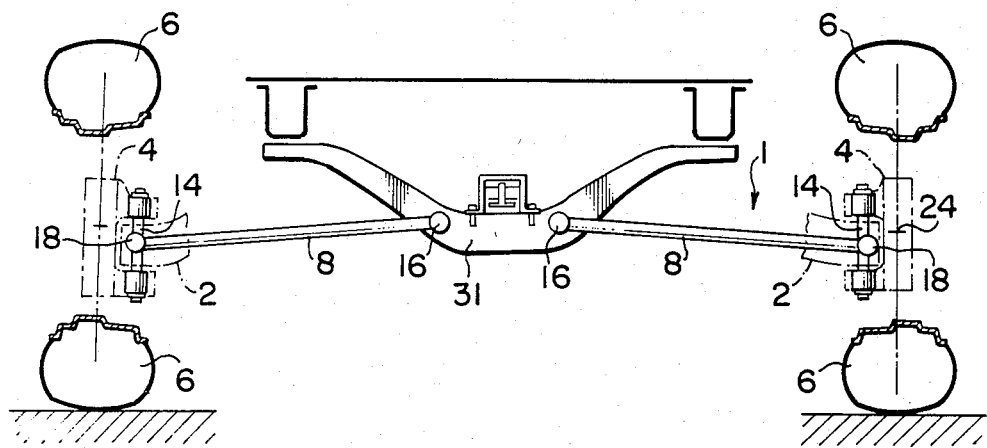
FIG. 4 is a rear end view similar to FIG. 2 but showing another embodiment.

Referring now to FIG. 4, the arrangement shown therein is substantially the same as the previously described arrangement so that corresponding parts are designated by the same reference numerals. In this embodiment, the pivot pin 14 for connecting the rear end portion of the swing arm is not inclined as in the previous embodiment but the feature of this embodiment is that the longitudinal shaft 16 for connecting the inward end of the control rod 8 to the rear sub-frame member 31 is located at a higher level than the longitudinal shaft 18 for connecting the outward end of the control rod 8 to the wheel carrier 4. With this arrangement, when an upward swinging movement is produced in the swing arm 2 as may be experienced in the outward wheel suspension when the automobile passes through a curved path, the rear portion of the carrier 4 will be forced transversely outwardly so that the carrier 4 and the rear wheel 6 will be pivoted about the pivot pin 14 producing a toe-in movement in the rear wheel 6.

Figure 5:
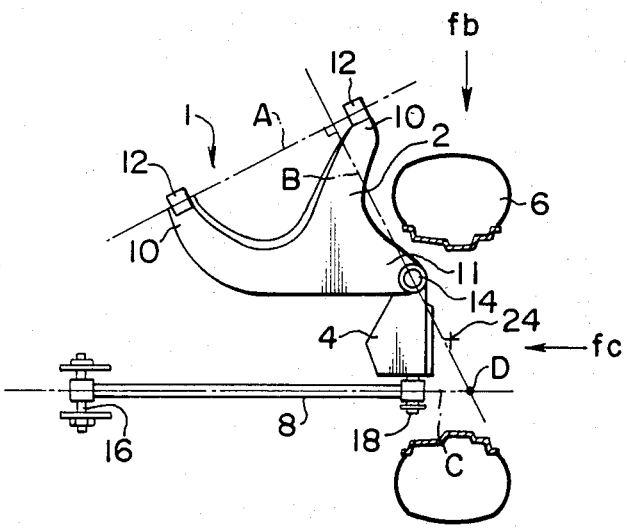
FIG. 5 is a plan view similar to FIG. 3 but showing a further embodiment.

FIG. 5 shows a further embodiment of the present invention which is substantially the same as the previous embodiments so that corresponding parts are designated by the same reference numerals as in the previous embodiments. In this embodiment, the arrangement is such that a line B which is perpendicular to the swing axis A and passing through the axis of the pivot pin 14 intersects a vertical plane C containing the longitudinal axis of the control rod 8 at a point D transversely outwardly and rearwardly of the center 24 of the rear wheel 6. When a rearwardly directed longitudinal force $f_b$ or an inwardly directed side force $f_c$ is applied to the rear wheel 6, substantially axial deformations are produced in the rubber bushes of the pivotable mounting member to allow the branched arms 10 of the swingable arm 2 to be displaced inwardly substantially along the swing axis A. Thus, the rear wheel 6 is turned slightly inwardly about the point D producing a toe-in movement in the rear wheel 6. The features of the arrangements in FIG. 5 may be combined with the features in FIGS. 2 and 3 and or those in FIG. 4.

The invention has thus been shown and described with reference to specific embodiments, however, it should be noted that the invention is in no way limited to the details of the illustrated structures but changes and modifications may be made without departing from the scope of the appended claims.

I claim:

1. An automobile rear wheel suspension mechanism including carrier means for carrying a rear wheel for rotation about an axis of rotation which passes through a center of the rear wheel, arm means having a rear end portion pivotably connected through substantially vertical pin means with said carrier means at a portion forwardly of said axis of rotation, said arm means having a forward end portion connected with an automobile body for vertical swinging movement about a swing axis inclined transversely inwardly and rearwardly with respect to a transverse line, substantially transversely extending control rod means having one end connected with the automobile body pivotably about a substantially longitudinally extending first axis and the other end connected, at a portion rearwardly of the axis or rotation of the rear wheel, with said carrier means for pivotable movement about a substantially longitudinally extending second axis.

2. An automobile rear wheel suspension mechanism in accordance with claim 1 in which said one end of the control rod means which is connected to the body is located transversely inwardly with respect to the other end and the substantially longitudinally extending first axis at which said one end of the control rod means is pivotably connected with the body is at a higher level than the second axis at which said other end of the control rod means is pivotably connected with the carrier means.

3. An automobile rear wheel suspension mechanism in accordance with claim 2 in which said one end of the control rod means is connected to a rear sub-frame member of the body.

4. An automobile rear wheel suspension mechanism in accordance with claim 1 in which said pin means has a longitudinal axis which is inclined forwardly and inwardly so that a downward extension of longitudinal axis of the pin means intersects a vertical plane passing through a longitudinal axis of the control rod means transversely outwardly and rearwardly of the center of the rear wheel.

5. An automobile rear wheel suspension mechanism in accordance with claim 4 in which said one end of the control rod means which is connected to the body is located transversely inwardly with respect to the other end and the substantially longitudinally extending first axis at which said one end of the control rod means is pivotably connected with the body is at a higher level than the second axis at which said other end of the control rod means is pivotably connected with the carrier means.

6. An automobile rear wheel suspension mechanism in accordance with claim 1 in which said pin means is located so that a line which is perpendicular to said swing axis and passing through axis of the pin means intersects a vertical plane passing through longitudinal axis of the control rod means rearwardly and transversely outwardly of the center of the rear wheel.

7. An automobile rear wheel suspension mechanism in accordance with claim 6 in which said one end of the control rod means which is connected to the body is located transversely inwardly with respect to the other end and the substantially longitudinally extending first axis at which said one end of the control rod means is pivotably connected with the body is at a higher level than the second axis at which said other end of the control rod means is pivotably connected with the carrier means.

8. An automobile rear wheel suspension mechanism in accordance with claim 6 in which said one end of the control rod means which is connected to the body is located transversely inwardly with respect to the other end and the substantially longitudinally extending first axis at which said one end of the control rod means is pivotably connected with the body is at a higher level than the second axis at which said other end of the control rod means is pivotably connected with the carrier means and said pin means has a longitudinal axis which is inclined forwardly and inwardly so that a downward extension of longitudinal axis of the pin means intersects a vertical plane passing through a longitudinal axis of the control rod means transversely outwardly and rearwardly of the center of the rear wheel.

9. An automobile rear wheel suspension mechanism in accordance with claim 6 in which said pin means has a longitudinal axis which is inclined forwardly and inwardly so that a downward extension of longitudinal axis of the pin means intersects a vertical plane passing through a longitudinal axis of the control rod means transversely outwardly and rearwardly of the center of the rear wheel.

10. An automobile rear wheel suspension mechanism including carrier means for carrying a rear wheel for rotation about an axis of rotation which passes through a center of the rear wheel, arm means having a rear end portion pivotably connected through substantially vertical pin means with said carrier means at a portion forwardly of said axis of rotation, said arm means having a forward end portion connected with an automobile body for vertical swinging movement about a swing axis inclined transversely inwardly and rearwardly with respect to a transverse line, substantially transversely extending control rod means having one end connected with the automobile body pivotably about a substantially longitudinally extending first axis and the other end connected, at a portion rearwardly of said portion where said arm means is connected to the carrier means, with said carrier means for pivotable movement about a substantially longitudinally extending second axis, said forward end portion of the arm means connected with a front sub-frame member of the body.

11. An automobile rear wheel suspension mechanism including carrier means for carrying a rear wheel for rotation about an axis of rotation which passes through a center of the rear wheel, arm means having a rear end portion pivotably connected through substantially vertical pin means with said carrier means at a portion forwardly of said axis of rotation, said arm means having a forward end portion connected with an automobile body for vertical swinging movement about a swing axis inclined transversely inwardly and rearwardly with respect to a transverse line, substantially transversely extending control rod means having one end connected with the automobile body pivotably about a substantially longitudinally extending first axis and the other end connected, at a portion rearwardly of said portion where said arm means is connected to the carrier means, with said carrier means for pivotable movement about a substantially longitudinally extending second axis, and strut means provided between the arm means and the automobile body.

* * * * *